US008223125B2

(12) United States Patent
Yen

(10) Patent No.: US 8,223,125 B2
(45) Date of Patent: Jul. 17, 2012

(54) MULTIPURPOSE WIRELESS TOUCHPAD MOUSE

(75) Inventor: Hung-Che Yen, Taipei (TW)

(73) Assignee: Liang Hsu, New Taipei (TW)

( * ) Notice: Subject to any disclaimer, the term of this patent is extended or adjusted under 35 U.S.C. 154(b) by 256 days.

(21) Appl. No.: 12/710,940

(22) Filed: Feb. 23, 2010

(65) Prior Publication Data

US 2011/0163958 A1 Jul. 7, 2011

(30) Foreign Application Priority Data

Jan. 4, 2010 (TW) ................................ 99200050 U

(51) Int. Cl.
*G06F 3/033* (2006.01)
(52) U.S. Cl. ........... 345/163; 345/158; 345/173; 463/37
(58) Field of Classification Search .................. 345/158, 345/163–166, 173–174; 463/37–38
See application file for complete search history.

(56) References Cited

U.S. PATENT DOCUMENTS

| 5,990,868 A * | 11/1999 | Frederick | 345/158 |
| 6,130,664 A * | 10/2000 | Suzuki | 345/158 |
| 2006/0028446 A1 * | 2/2006 | Liberty et al. | 345/158 |
| 2006/0256085 A1 * | 11/2006 | Tsai et al. | 345/163 |
| 2007/0135178 A1 * | 6/2007 | Albulet et al. | 455/574 |
| 2008/0030380 A1 * | 2/2008 | Rensberger et al. | 341/22 |
| 2009/0073122 A1 * | 3/2009 | Hou et al. | 345/163 |
| 2010/0265179 A1 * | 10/2010 | Ram | 345/163 |

FOREIGN PATENT DOCUMENTS

TW    I307853    3/2009

\* cited by examiner

*Primary Examiner* — Lun-Yi Lao
*Assistant Examiner* — Sosina Abebe
(74) *Attorney, Agent, or Firm* — Kirton McConkie; Evan R. Witt

(57) ABSTRACT

A multipurpose wireless touchpad mouse includes a mouse body, a first button set and a second button set respectively mounted in the top and bottom sides of the mouse body, and a control module mounted in an accommodation chamber inside the mouse body and electrically connected with the first button set and the second button set for sensing the upside-up position or upside-down position of the mouse body by means of a direction sensor and for enabling a changeover switch controller thereof to switch between the first button set and the second button set subject to the upside-up or upside-down position of the mouse body sensed by the direction sensor so that the mouse body can be used with the first button set as a mouse, or used with the second button set as a remote controller, laser pointer, A/V controller, presentation remote controller, direction controller or game controller.

9 Claims, 5 Drawing Sheets

MULTIPURPOSE WIRELESS TOUCHPAD MOUSE

This application claims the priority benefit of Taiwan patent application number 099200050 filed on Jan. 4, 2010.

BACKGROUND OF THE INVENTION

1. Field of the Invention

The present invention relates to touchpad mice and more particularly, to a multipurpose wireless touchpad mouse, which switches the operation mode automatically subject to the operation of a direction sensor to sense the upside-up or upside-down position of the mouse body, so that the mouse body can be used as a computer mouse, or a remote controller, laser pointer, A/V controller, presentation remote controller, direction controller or game controller.

2. Description of the Related Art

Following continuous development of electronic technology, many different electronic and electric products have been created and have appeared on the market. The use of computer related products brings use convenience, comfort and pleasure. In addition to paper processing and computing functions, an advanced computer provides may other functions, such as graphics, text editing, photograph making and editing, game, internet, presentation and multimedia functions. In consequence, a computer system may be equipped with joystick type game controller, keyboard type game controller, game pointer, remote controller and/or laser pointer for different applications. However, these peripheral apparatus occupy much space around the computer system. Further, it is inconvenient to switch these peripheral apparatus. In actual practice, the user may encounter the following problems:

1. Regular computer peripheral apparatus, such as A/V controller, presentation controller, laser pointer and direction controller provide different functions for different applications. It is inconvenient to carry and keep multiple different peripheral apparatus.
2. To fit different peripheral apparatus, different execution programs must be installed in the computer. Installing multiple different execution programs in the computer occupies much memory space of the computer, affecting the operation speed of the computer.

Further, Taiwan Patent No. 1307853 discloses a combination of a presentation controller and a mouse, entitled "Multipurpose presentation controller" and issued on Mar. 21, 2009. This structure of multipurpose presentation controller, as shown in FIG. 5, comprises a housing A carrying a first button set A1 and a second button set A2, a mouse module (not shown) mounted in the housing A and coupled with the second button set A2, a display unit A3 mounted on the outside of the housing A, a control unit and a circuit module (not shown) mounted inside the housing A for receiving signals from the first button set A1 and the second button set A2 respectively, and a gravity switch (not shown) mounted in the housing A for power control. The gravity switch will switch on the power supply of the mouse module only when the light port A4 on the bottom side of the housing A faces downwards or is tilted within 45-degrees, i.e., the multipurpose presentation controller is used as a computer mouse when the operation area A5 of the housing A is kept in contact with the table. When the user holds the multipurpose presentation controller in hand to keep the outer surface A51 of the operation area A5 upwards, the multipurpose presentation controller can be used as a laser pointer, time controller, presentation controller or remote controller for multimedia player. However, this design of multipurpose presentation controller is still not satisfactory in function. The user may trigger the second button set A2 accidentally when using the first button set A1, or trigger the second button set A1 accidentally when using the second button set A2, causing an error.

Therefore, there is a need for a multipurpose mouse that can be used as a computer mouse or a remote controller, laser pointer, A/V controller, presentation remote controller, direction controller or game controller in a convenient way and, that eliminates the problems of the aforesaid prior art design.

SUMMARY OF THE INVENTION

The present invention has been accomplished under the circumstances in view. It is one object of the present invention to provide a multipurpose wireless touchpad mouse, which can be selectively used as a computer mouse, or a remote controller, laser pointer, A/V controller, presentation remote controller, direction controller or game controller. It is another object of the present invention to provide a multipurpose wireless touchpad mouse, which automatically switches the operation mode subject to the operation of a direction sensor to sense the upside-up or upside-down position of the mouse body.

To achieve these and other objects of the present invention, a multipurpose wireless touchpad mouse comprises a mouse body, a first button set mounted in the top side of the mouse body and having at least one input button for instruction input, a second button set mounted in the bottom side of the mouse body and having a plurality of control buttons, and a control module mounted in the accommodation chamber inside the mouse body and electrically connected with the first button set and the second button set. The control module comprises a direction sensor adapted for sensing the position of the mouse body between an upside-up position and an upside-down position, a changeover switch controller for switching between the first button set and the second button set subject to the upside-up position or upside-down position of the mouse body sensed by the direction sensor and a displacement sensor adapted for sensing displacement of the mouse body. Thus, the multipurpose wireless touchpad mouse can be used with the first button set as a computer mouse, or used with the second button set as a remote controller, laser pointer, A/V controller, presentation remote controller, direction controller or game controller.

Further, the mouse body comprises a bottom cover shell located on the bottom side thereof and a top cover shell covering the bottom cover shell and located on the top side thereof. The at least one input button of the first button set is mounted in the top side of the top cover shell. The second button set is mounted in the outside wall of the bottom cover shell. Further, the at least one input button of the first button set comprises a left mouse button, a right mouse button and a middle mouse button for performing mouse functions. Further, the control buttons of the second button set comprise a play/pause button, a volume control button and a selector button for performing the functions of a remote controller. Further, the control buttons of the second button set can be laser pointer control buttons for controlling the operation of a laser pointer installed in said mouse body, cursor control buttons for moving a cursor upward, downward, rightward and leftward on a display screen, or trackball buttons for controlling movement of a cursor on a display screen. Further, the directions sensor of the control module can be a G-sensor or gyroscope.

DETAILED DESCRIPTION OF THE PREFERRED EMBODIMENT

Figure 1:
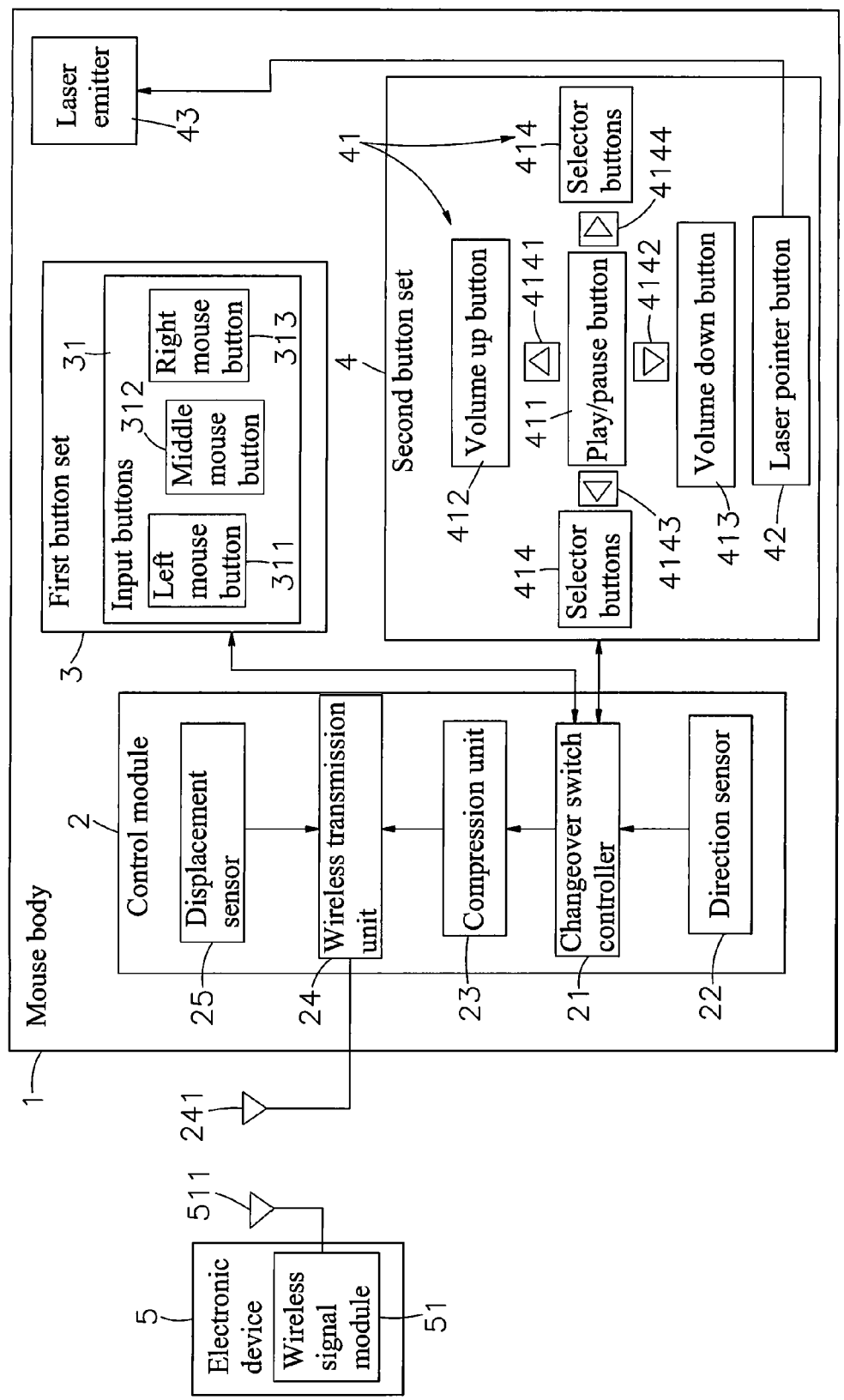
FIG. 1 is a circuit block diagram of a multipurpose wireless touchpad mouse in accordance with the present invention.
Figure 2:
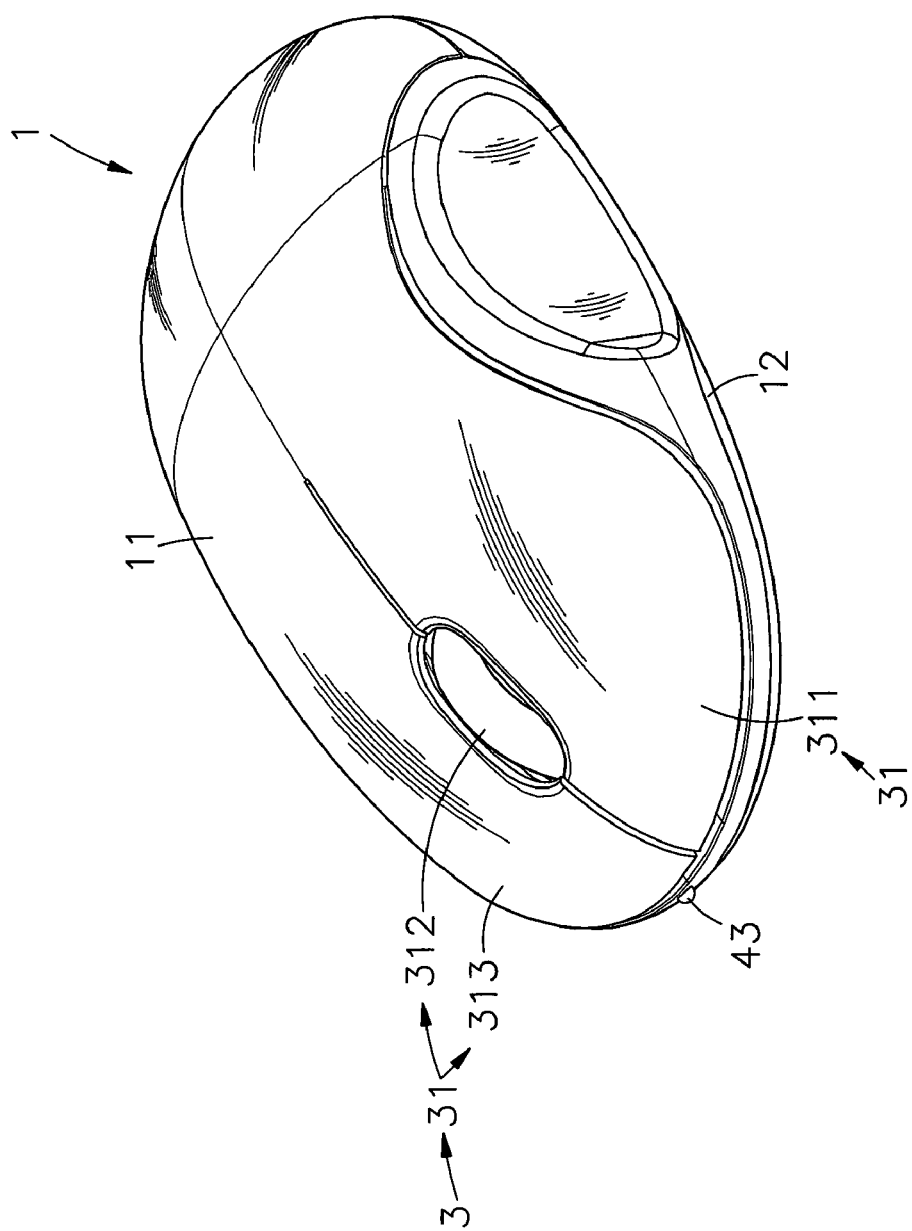
FIG. 2 is an oblique top elevation of the multipurpose wireless touchpad mouse in accordance with the present invention.
Figure 3:
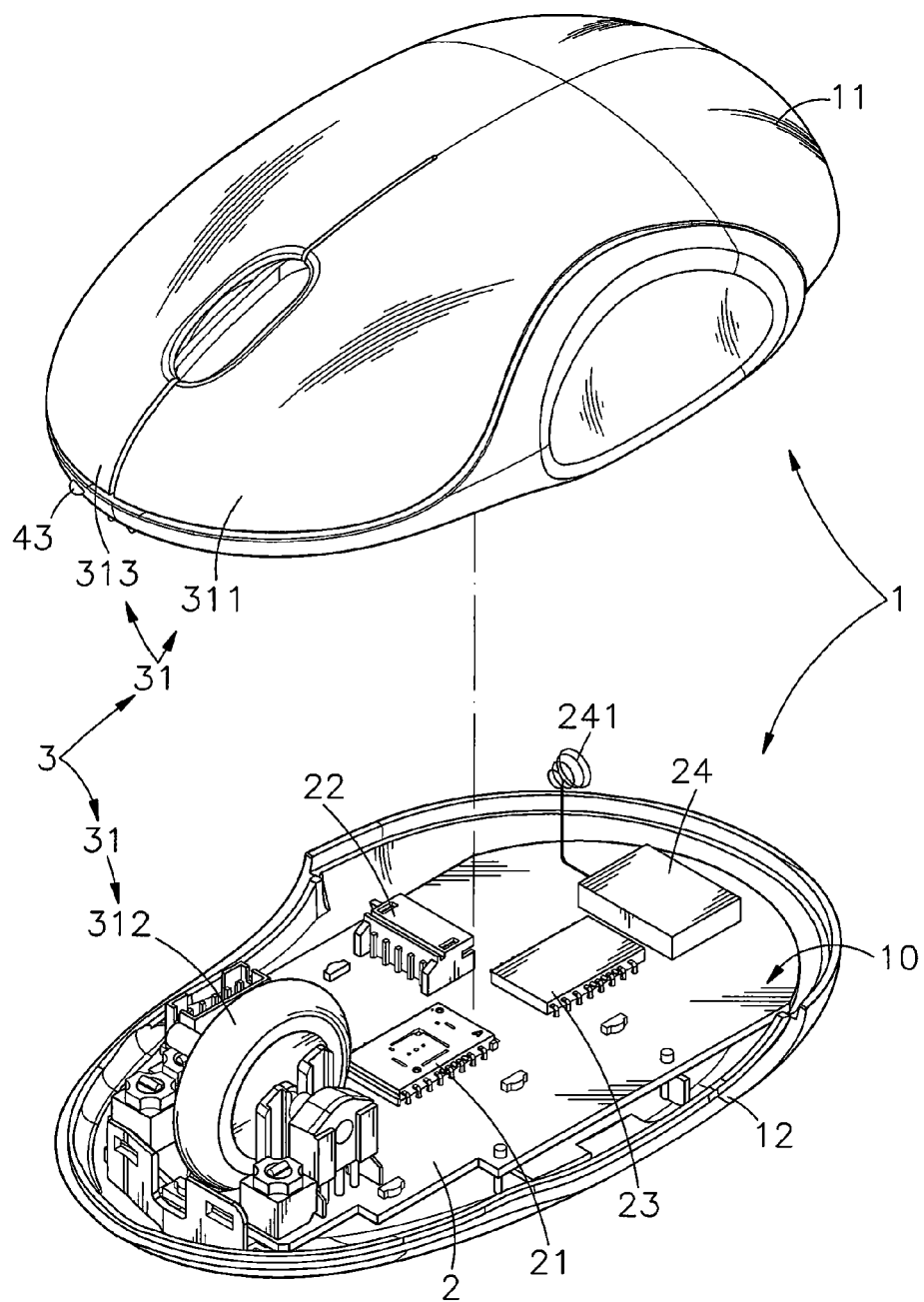
FIG. 3 is an exploded view of the multipurpose wireless touchpad mouse in accordance with the present invention.

Referring to FIGS. 1-3, a multipurpose wireless touchpad mouse in accordance with the present invention is shown comprising a mouse body 1, a control module 2, a first button set 3 and a second button set 4.

The mouse body 1 comprises a top cover shell 11 and a bottom cover shell 12. The top cover shell 11 and the bottom cover shell 12 are fastened together, defining therein an accommodation chamber 10.

The control module 2 comprises a changeover switch controller 21, a direction sensor 22 electrically connected to the changeover switch controller 21, a compression unit 23 electrically connected with the changeover switch controller 21, a wireless transmission unit 24 electrically connected with the compression unit 23 and having an antenna 241 connected thereto for transmitting a wireless signal, and a displacement sensor 25 electrically connected to the wireless transmission unit 24. The control module 2 further has a circuit layout and related electronic and electric components (because the circuit layout and related electronic and electric components is of the known art similar to a conventional circuit module system, no further detailed description in this regard is necessary), enabling the changeover switch controller 21, the direction sensor 22, the compression unit 23, the wireless transmission unit 24 and the displacement sensor 25 to transmit signal during operation.

The first button set 3 includes at least one input button 31.

The second button set 4 includes a plurality of control buttons 41, for example, a play/pause button 411, a volume up button 412, a volume down button 413, selector buttons 414 (up shift button 4141, down shift button 4142, left shift button 4143 and right shift button 4144). A laser pointer button 42 may be used for controlling the operation of a laser emitter 43 that is mounted in the front side of the mouse body 1. The control buttons 41 can be cursor control buttons for moving a cursor upward, downward, rightward and leftward, or trackball buttons for controlling movement of a cursor.

During installation, the top cover shell 11 and the bottom cover shell 12 are fastened together to have the control module 2 be accommodated in the accommodation chamber 10, enabling the displacement sensor 25 of the control module 2 to be located on the outside of the bottom wall of the bottom cover shell 12, at least one input button 31 to be located on the outside of the top wall of the top cover shell 11 and the second button set 4 to be located on the outside of the bottom wall of the bottom cover shell 12. After installation of the first button set 3 and the second button set 4 in the mouse body 1, the first button set 3 and the second button set 4 are respectively electrically connected to the control module 2. Thus, the user can operate the at least one input button 31 of the first button set 3 to perform the mouse functions. The user can also operate the second button set 4 to perform the functions of a remote controller, laser pointer, A/V controller, presentation remote controller, direction controller or game controller. Further, the mouse body 1 can be turned upside down, causing the direction sensor 22 (for example, G-sensor or gyroscope) of the control module 2 to switch the first button set 3 and the second button set 4.

The wireless transmission unit 24 of the control module 2 can be a Bluetooth module, radio-frequency signal processing module or radio signal transmission module for wireless signal transmission. Further, the at least one input button 31 according to this embodiment includes a left mouse button 311, a right mouse button 313 and a middle mouse button 312.

Figure 4:
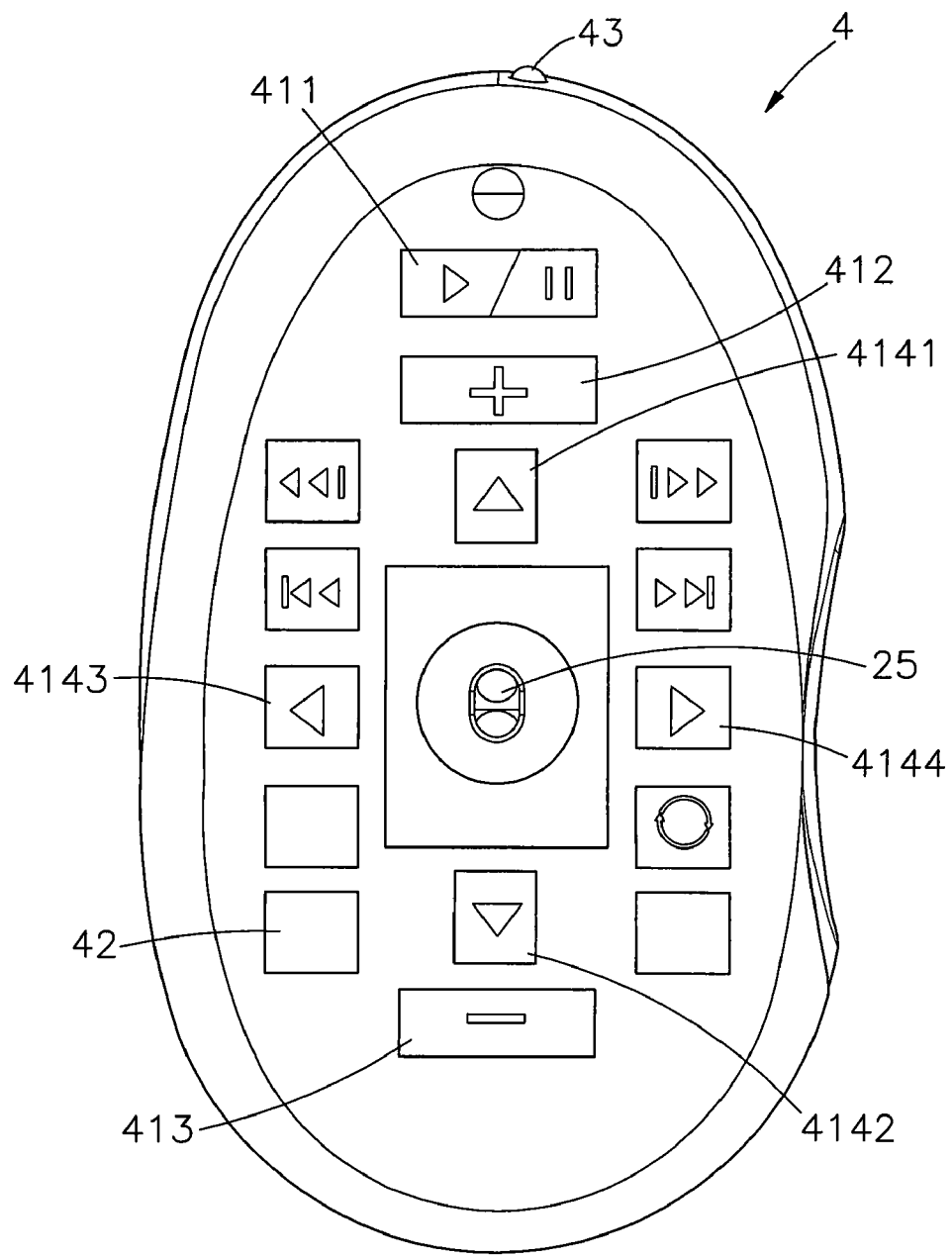
FIG. 4 is a bottom view of the multipurpose wireless touchpad mouse in accordance with the present invention.
Figure 5:
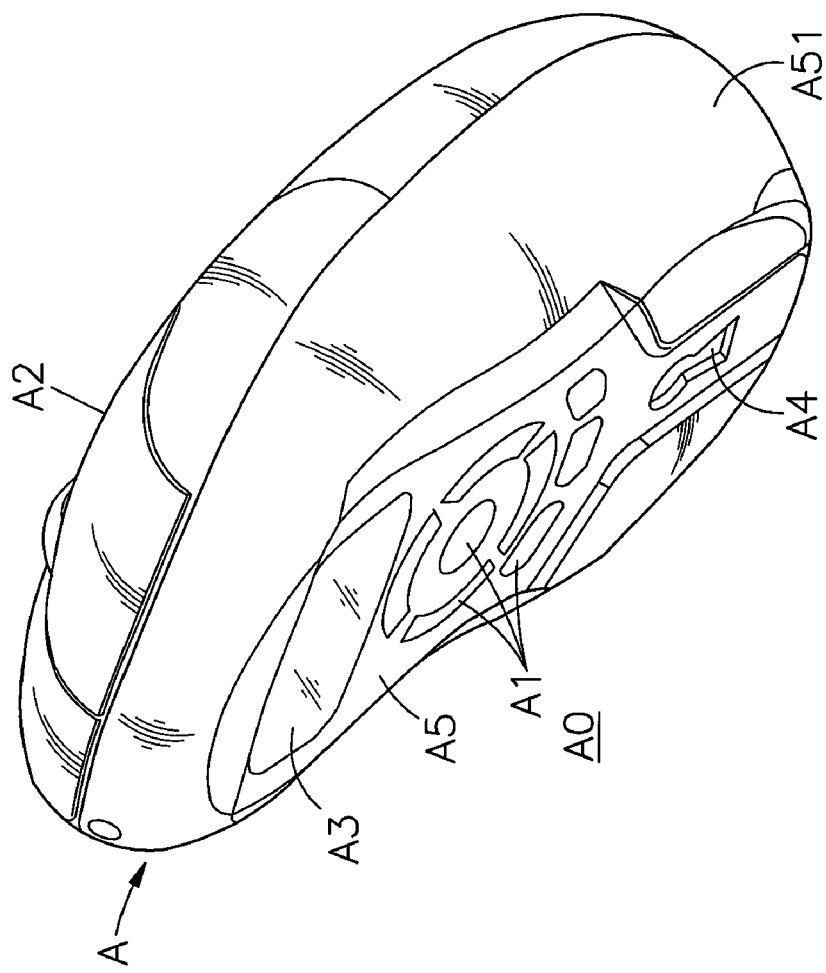
FIG. 5 is an oblique bottom elevation of a multipurpose presentation controller according to the prior art.

Referring to FIG. 4 and FIGS. 1-3 again, when using the multipurpose wireless touchpad mouse as a wireless mouse, the mouse body 1 is placed on a flat surface or mouse pad with the top cover shell 11 facing upwards. Thus, the user can operate the left mouse button 311, the right mouse button 313 and the middle mouse button 312 to perform the mouse functions. When the user operates the left mouse button 311, the right mouse button 313 and the middle mouse button 312, a corresponding signal is produced and transmitted to the changeover switch controller 21 of the control module 2, which transmits the signal to the compression unit 23 for processing and compression. After compression, the compression unit 23 transmits the compressed signal to the wireless transmission unit 24 for transmitting to an external electronic device 5 (such as desk computer, notebook computer, or the like) wirelessly through the antenna 241. The external electronic device has a wireless signal module 51 (Bluetooth module, radio-frequency signal processing module or radio signal transmission module) with a receiving antenna 511 for receiving wireless signals from the wireless transmission unit 24 of the control module 2 of the multipurpose wireless touchpad mouse.

When the mouse body 1 is turned upside down with the bottom shell 12 facing upwards, the direction sensor 22 of the control module 2 senses the direction change and outputs a corresponding signal to the changeover switch controller 21, causing the changeover switch controller 21 to switch the mode of the first button set 3 and second button set 4 for performing the functions of a remote controller, laser pointer, A/V controller, presentation remote controller, direction controller or game controller. When the user presses the laser pointer button 42 of the second button set 4, the laser emitter 43 that is mounted in the front side of the mouse body 1 is driven to emit a laser beam for pointing something of interest out on a map, blackboard, etc. When the user operates the control buttons 41, a corresponding signal is produced and transmitted to the changeover switch controller 21 of the control module 2, which transmits the signal to the compression unit 23 for processing and compression. After compression, the compression unit 23 transmits the compressed signal to the wireless transmission unit 24 for transmitting to the receiving antenna 511 of the wireless signal module 51 of an external electronic device 5 (such as desk computer, notebook computer, multimedia player, projector, audio recorder and player, audio system, TV or the like) wirelessly through the antenna 241. Thus, the user can control the operation of the external electronic device 5.

When the multipurpose wireless touchpad mouse is used as a remote controller, the user can operate the play/pause button 411 of the control buttons 41 of the second button set 4 to start or pause the external electronic device 5, the volume up button 412/volume down button 413 to regulate the voice volume of the external electronic device 5, the selector buttons 414 (up shift button 4141, down shift button 4142, left shift button 4143 and right shift button 4144) to drive the external electronic device 5 to change the page, to jump to selection, to switch multiple selections or to select or switch operation functions. By means of the control buttons 41 of the second button set 4, the multipurpose wireless touchpad mouse can be used as a remote controller, laser pointer, A/V controller, presentation remote controller, direction controller or game controller.

As stated above, when the mouse body 1 of the multipurpose wireless touchpad mouse is kept in the position with the top cover shell 11 or bottom cover shell 12 facing upwards, the direction sensor 22 of the control module 2 detects the positioning of the mouse body 1 and switches the operation mode of the first button set 3 and the second button set 4 subject its detection result. Thus, the mouse body 1 can be used with the first button set 3 to perform the mouse functions, or used with the second button set 4 to perform the functions of a remote controller, laser pointer, A/V controller, presentation remote controller, direction controller or game controller, reducing the number of peripheral apparatus of the external electronic device 5, saving memory space of the external electronic device 5 and facilitating high-speed operation of the external electronic device 5.

In conclusion, the invention provides a multipurpose wireless touchpad mouse having advantages and features as follows:
1. Subject to the sensing operation of the direction sensor 22 (G-sensor or gyroscope) of the control module 2 in the accommodation 10 of the mouse body 1 to detect the upside-up or upside-down positioning of the mouse body 1, the control module 2 automatically switches the operation mode of the multipurpose wireless touchpad mouse, enabling the multipurpose wireless touchpad mouse to be used with the first button set 3 as a mouse, or used with the second button set 4 as a remote controller, laser pointer, A/V controller, presentation remote controller, direction controller or game controller, without causing miss operation of the first button set 3 or the second button set 4.
2. The mouse body 1 can be used with the second button set 4 as a remote controller, laser pointer, A/V controller, presentation remote controller, direction controller or game controller for controlling the operation of an external electronic device 5, reducing the number of peripheral apparatus of the external electronic device 5, saving the memory space of the external electronic device 5 and facilitating high-speed operation of the external electronic device 5.
3. When using the multipurpose wireless touchpad mouse of the present invention with an external electronic device 5, it simply needs the execution program of the multipurpose wireless touchpad mouse of the present invention. Because the use of the multipurpose wireless touchpad mouse does not need to install any other application software program in the external electronic device 5, the invention saves the memory space of the external electronic device 5.
4. Subject to sensing operation of the direction sensor 22 of the control module 2 to detect the position of the mouse body 1, the first button set 3 and the second button set 4 are alternatively switched by the changeover switch controller 21, avoiding interference.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:
1. A multipurpose wireless touchpad mouse, comprising:
a mouse body, said mouse body having a top side, a bottom side opposite to said top side and an accommodation chamber defined in between said top side and said bottom side;
a first button set mounted in the top side of said mouse body, said first button set comprising at least one input button for instruction input;
a second button set mounted in the bottom side of said mouse body, said second button set comprising a plurality of control buttons; and
a control module mounted in said accommodation chamber inside said mouse body and electrically connected with said first button set and said second button set, said control module comprising a direction sensor adapted for sensing the position of said mouse body between an upside-up position and an upside-down position, a changeover switch controller for switching between said first button set and said second button set subject to the upside-up position or upside-down position of said mouse body sensed by said direction sensor and a displacement sensor adapted for sensing displacement of said mouse body,
wherein said control module further comprises a wireless transmission unit adapted for transmitting signals to the outside wirelessly, and a compression unit electrically connected in series between said changeover switch controller and said wireless transmission unit and adapted for receiving and compressing signals from said changeover switch controller for transmission to the outside wirelessly through said wireless transmission unit.

2. The multipurpose wireless touchpad mouse as claimed in claim 1, wherein said mouse body comprises a bottom cover shell located on the bottom side thereof and a top cover shell covering said bottom cover shell and located on the top side thereof; said at least one input button of said first button set is mounted in a top side of said top cover shell; said second button set is mounted in an outside wall of said bottom cover shell.

3. The multipurpose wireless touchpad mouse as claimed in claim 2, wherein said at least one input button comprises a left mouse button, a right mouse button and a middle mouse button for performing mouse functions.

4. The multipurpose wireless touchpad mouse as claimed in claim 1, wherein said control buttons of said second button set comprise a play/pause button, a volume control button and a selector button for performing the functions of a remote controller.

5. The multipurpose wireless touchpad mouse as claimed in claim 1, wherein said control buttons of said second button set are laser pointer control buttons for controlling the operation of a laser pointer installed in said mouse body.

6. The multipurpose wireless touchpad mouse as claimed in claim 1, wherein said control buttons of said second button set are cursor control buttons for moving a cursor upward, downward, rightward and leftward on a display screen.

7. The multipurpose wireless touchpad mouse as claimed in claim 1, wherein said control buttons of said second button set are trackball buttons for controlling movement of a cursor on a display screen.

8. The multipurpose wireless touchpad mouse as claimed in claim 1, wherein the direction sensor of said control module is a G-sensor.

9. The multipurpose wireless touchpad mouse as claimed in claim 1, wherein the direction sensor of said control module is a gyroscope.

* * * * *